US011288170B1

(12) United States Patent
Chen et al.

(10) Patent No.: US 11,288,170 B1
(45) Date of Patent: Mar. 29, 2022

(54) LOG ANALYSIS DEBUGGING WITHOUT RUNNING ON REAL PRODUCTION ENVIRONMENT

(71) Applicant: INTERNATIONAL BUSINESS MACHINES CORPORATION, Armonk, NY (US)

(72) Inventors: Xiao Ling Chen, Beijing (CN); Heng Wang, Beijing (CN); Tao Guan, Toronto (CA); Wen Ji Huang, Beijing (CN); Wen Bin Han, Beijing (CN); Sheng Shuang Li, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/247,397

(22) Filed: Dec. 10, 2020

(51) Int. Cl.
*G06F 11/36* (2006.01)

(52) U.S. Cl.
CPC ........ *G06F 11/3664* (2013.01); *G06F 11/364* (2013.01); *G06F 11/3612* (2013.01)

(58) Field of Classification Search
None
See application file for complete search history.

(56) References Cited

U.S. PATENT DOCUMENTS

| | | | |
|---|---|---|---|
| 9,104,797 B1 * | 8/2015 | Sekhar | G06F 11/366 |
| 9,122,795 B1 | 9/2015 | Daudel | |
| 9,454,461 B1 * | 9/2016 | Bates | G06F 8/70 |
| 9,740,594 B2 | 8/2017 | Delporte | |
| 9,946,630 B2 | 4/2018 | Beraldo Dos Santos | |
| 10,176,078 B1 * | 1/2019 | Motel | G06F 11/3471 |
| 2003/0023905 A1 * | 1/2003 | Boling | G06F 9/4812 714/34 |
| 2009/0248721 A1 * | 10/2009 | Burton | G06F 11/3604 |
| 2011/0271148 A1 * | 11/2011 | Eigler | H01F 10/32 714/45 |
| 2013/0042223 A1 * | 2/2013 | Hinkle | G06F 11/3612 717/128 |
| 2014/0033181 A1 | 1/2014 | Wang | |

(Continued)

FOREIGN PATENT DOCUMENTS

WO    WO-2019013033 A1 *   1/2019   ............ G06F 11/07

OTHER PUBLICATIONS

DWARF Debugging Information Format Committee, "DWARF Debugging Information Format Version 5," Feb. 13, 2017, last retrieved from http://dwarfstd.org/doc/DWARF5.pdf on Jul. 31, 2021. (Year: 2017).*

(Continued)

*Primary Examiner* — Andrew M. Lyons
(74) *Attorney, Agent, or Firm* — Dmitry Paskalov

(57) ABSTRACT

A computer receives a log file, where the log file comprises records associated with the instructions in a source code. The computer loads, using a debugger, the log file and the source code. The computer receives a loading address from the log file. The computer updates a debugging data format (DWARF) with the one or more records of the log file, where the DWARF is accessed using the loading address and comprises one or more data structure entries. The computer identifies a calling address from the log file and identifies the one or more data structure entries associated with the calling address.

17 Claims, 7 Drawing Sheets

(56) References Cited

U.S. PATENT DOCUMENTS

2015/0347220 A1* 12/2015 Hermany ............ G06F 11/0778
  714/48
2018/0046585 A1* 2/2018 Okhravi ................ G06F 16/245

OTHER PUBLICATIONS

Théophile Bastian, Stephen Kell, and Francesco Zappa Nardelli. 2019. Reliable and Fast DWARF-Based Stack Unwinding. Proc. ACM Program. Lang. 3, OOPSLA, Article 146 (Oct. 2019), 24 pages. https://doi.org/10.1145/3360572 (Year: 2019).*

Mell, et al., "The NIST Definition of Cloud Computing", National Institute of Standards and Technology, Special Publication 800-145, Sep. 2011, 7 pages.

* cited by examiner

LOG ANALYSIS DEBUGGING WITHOUT RUNNING ON REAL PRODUCTION ENVIRONMENT

BACKGROUND

The present invention relates, generally, to the field of computing, and more particularly to performing a log debugging without running the debugger in a real production environment.

A real production environment is a computer system in which a computer program or software component is deployed and executed. In simple cases, such as developing and immediately executing a program on the same machine, there may be a single environment, but in industrial use the development environment and production environment are separated. A development environment is a computer system in which the computer program is generated by compiling it from the computer code. This structured release management process allows phased deployment testing and rollback in case of execution problems.

Computer code or a source code is any collection of instructions, written on a computer using a human-readable programming language as ordinary text that can be transformed by an assembler or compiler into binary machine code to be executed by a computer. Due to errors (bugs) in the computer code, the compiled binary machine code may malfunction and generate an error report, such as a log file, in order to assist the developer to determine the error in the computer code and enable error debugging and correction. Typically, in order to determine and fix errors in the computer code, developers use a debugging software such as a debugger.

A debugger is a software program that is used to test and debug computer code. A debugger can be a standalone software or an integrated part to an Integrated Development Environment (IDE) software. During debugging, the computer code is executed on an instruction set simulator (ISS), a technique that allows halting the execution of the computer code when specific conditions are encountered or perform step-by-step execution and analysis of the variables after each instruction of the source code.

SUMMARY

According to one embodiment, a method, computer system, and computer program product for log debugging is provided. The present invention may include a computer receives a log file, where the log file comprises records associated with the instructions in a source code. The computer loads, using a debugger, the log file and the source code. The computer receives a loading address from the log file. The computer updates a debugging data format (DWARF) with the one or more records of the log file, where the DWARF is accessed using the loading address and comprises one or more data structure entries. The computer identifies a calling address from the log file and identifies the one or more data structure entries associated with the calling address.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
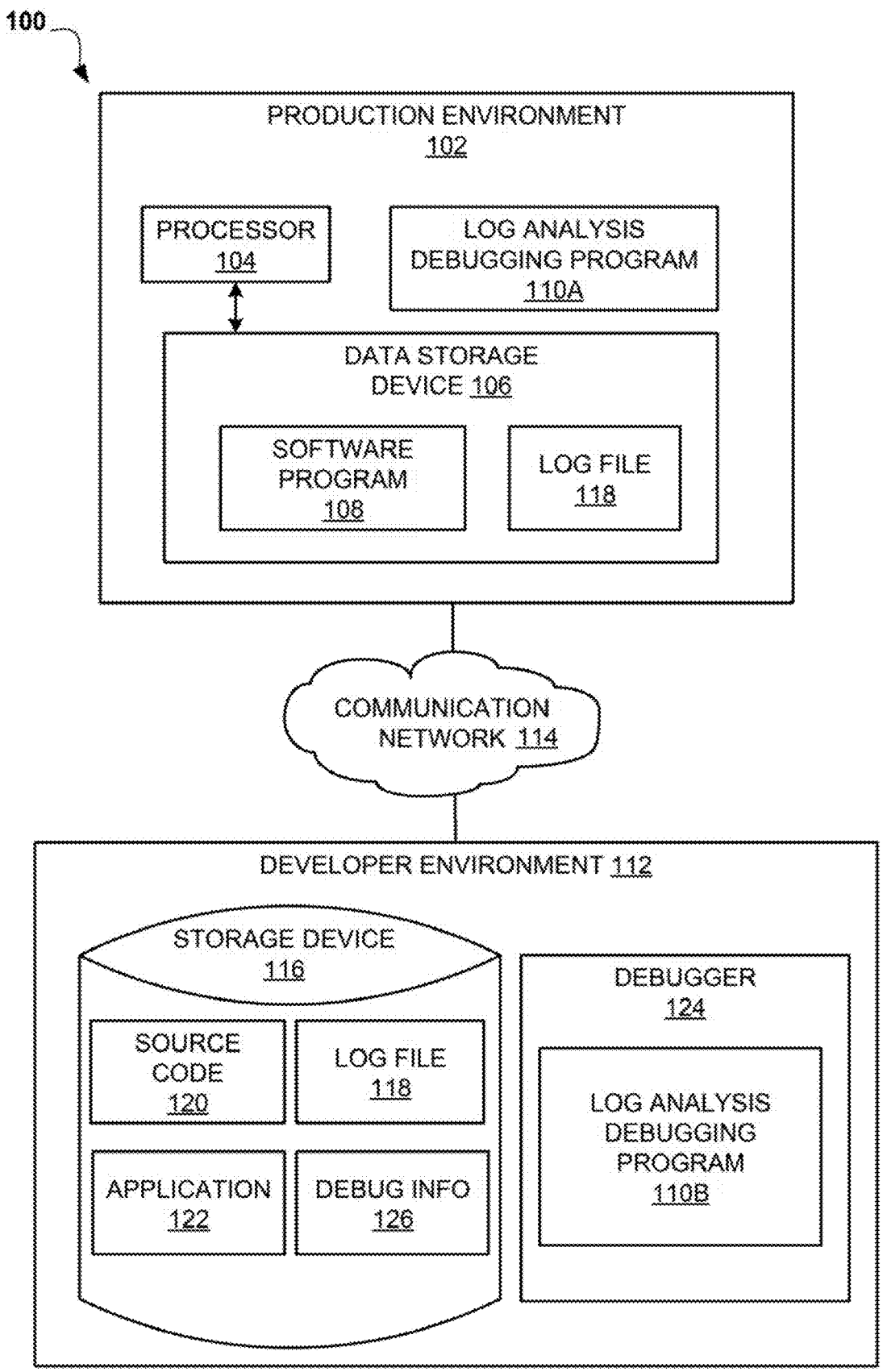
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to performing log debugging without running the debugger in a real production environment. The following described exemplary embodiments provide a system, method, and program product to, among other things, perform debugging of the computer code without running a debugger on the real production environment (client computing device). Therefore, the present embodiment has the capacity to improve the technical field of debugging by analyzing a log file from the production environment, simulating a debugger environment, and displaying stack frame without physically running a debugger to execute the software program at the production environment.

As previously described, a debugger is a software program that is used to test and debug computer code in order to find and resolve errors in the software. A debugger can be a standalone software or an integrated part to an Integrated Development Environment (IDE) software. During debugging, the computer code is executed on an instruction set simulator (ISS), a technique that allows halting the execution of the computer code when specific conditions are encountered or perform step-by-step execution and analysis of the variables after each instruction of the source code.

When a developer receives an error report, typically in a format of a log file from the production environment, running a debugger on the client computer is generally impracticable because the customer has only an executable binary program without a debugging software and a source code. Currently, the developer may determine an error or narrow down the root cause of the problem by mapping the received log file with the source code or a hard code log that was generated before delivering the product to the client. However, when the log file is large (frequently log files exceed 100 Mb), bug identification and elimination process is inefficient and frequently impossible. As such, it may be advantageous to, among other things, implement a system that simulates a debugging of a source code without running the debugger on the real production environment (client computing device) by mapping debug info and log data with current program execution addresses, thus allowing variable type and stack frames views including breakpoints set and hit functionality without physical execution of the software program.

Stack frame is an abstraction of a stack that provides the execution context of one or more structured instructions (functions). A stack frame, typically, holds the local variables of each function and the arguments accompanying it. Stack frame view is typically, an active view on a display runtime information that describe the name, type, and value of local variables and arguments, that appear in various debug windows as a consequence of executing an instruction. For example, stack frame view may display a list of active procedures and functions. In addition, it may display a back-trace of the stack frame, line per frame view, currently executing frame and future frames up the stack.

According to one embodiment, a log analysis debugging program may map debug info with a current program execution address that is generated by the compiler and by using an entry address of the called routine's code entry address of the called routine's code that is typically inserted by the compiler, unwind a stack frame and allow debugging without running an actual debugger software on a computing device of a client.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to enable debugging of the software program without running a debugger on a client computing device by mapping debug info and log data from the log file using a current program execution address (CurrentAddr) and an entry address of the called routine's code (CallingAddr).

Referring to FIG. 1, an exemplary networked computer environment 100 is depicted, according to at least one embodiment. The networked computer environment 100 may include production environment 102 and a developer environment 112 interconnected via a communication network 114. According to at least one implementation, the networked computer environment 100 may include a plurality of production environments 102 and developer environments 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The production environment 102 may include a processor 104 and a data storage device 106 that is enabled to host and run a software program 108 that may generate a log file 118, and a log analysis debugging program 110A and may communicate with the developer environment 112 via the communication network 114, in accordance with one embodiment of the invention. Production environment 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the production environment 102 may include internal components 502a and external components 504a, respectively.

The developer environment 112 may be a laptop computer, netbook computer, personal computer (PC), a desktop computer, or any programmable electronic device or any network of programmable electronic devices capable of hosting and running a log analysis debugging program 110B, debugger 124, and a storage device 116 and communicating with the production environment 102 via the communication network 114, in accordance with embodiments of the invention. The log analysis debugging program 110B may be a part of the debugger 124. In another embodiment, the log analysis debugging program 110B may be a stand-alone application that controls the debugger 124 As will be discussed with reference to FIG. 5, the developer environment 112 may include internal components 502b and external components 504b, respectively. The developer environment 112 may also operate in a cloud computing service model, such as Software as a Service (SaaS), Platform as a Service (PaaS), or Infrastructure as a Service (IaaS). The developer environment 112 may also be located in a cloud computing deployment model, such as a private cloud, community cloud, public cloud, or hybrid cloud.

The storage device 116 may store a log file 118, a source code 120, application 122, and debug info 126. The source code 120 may be a source code of software program 108 that is used by a client and requires a debugging. The application 122 and debug info 126 may be generated by the compiler during compilation of the source code 120. The log file 118 may be a log record that was generated by the software program 108 in the production environment 102 and was sent or replicated to the developer environment 112 via communication network 114. Typically, the log file 118 may include records such as filename of the source code (FileName), a line number of log data generated (LineNo), a function of record data (FuncName), a variable name (VarName), and a value of the recorded variable (VarValue). According to an example embodiment, the log file 118 may include additional fields in each record such as current program execution address (CurrentAddr) and an entry address of the called routine's code entry address of the called routine's code or later the return code (CallingAddr).

According to the present embodiment, the log analysis debugging program 110A, 110B may be a program capable of receiving the log file from the production environment 102 and enable a debugging of the software program 108 on the developer environment 112 without running a debugger (or executing the software program 108) on the production environment 102. The log analysis debugging method is explained in further detail below with respect to FIG. 2.

Figure 2:
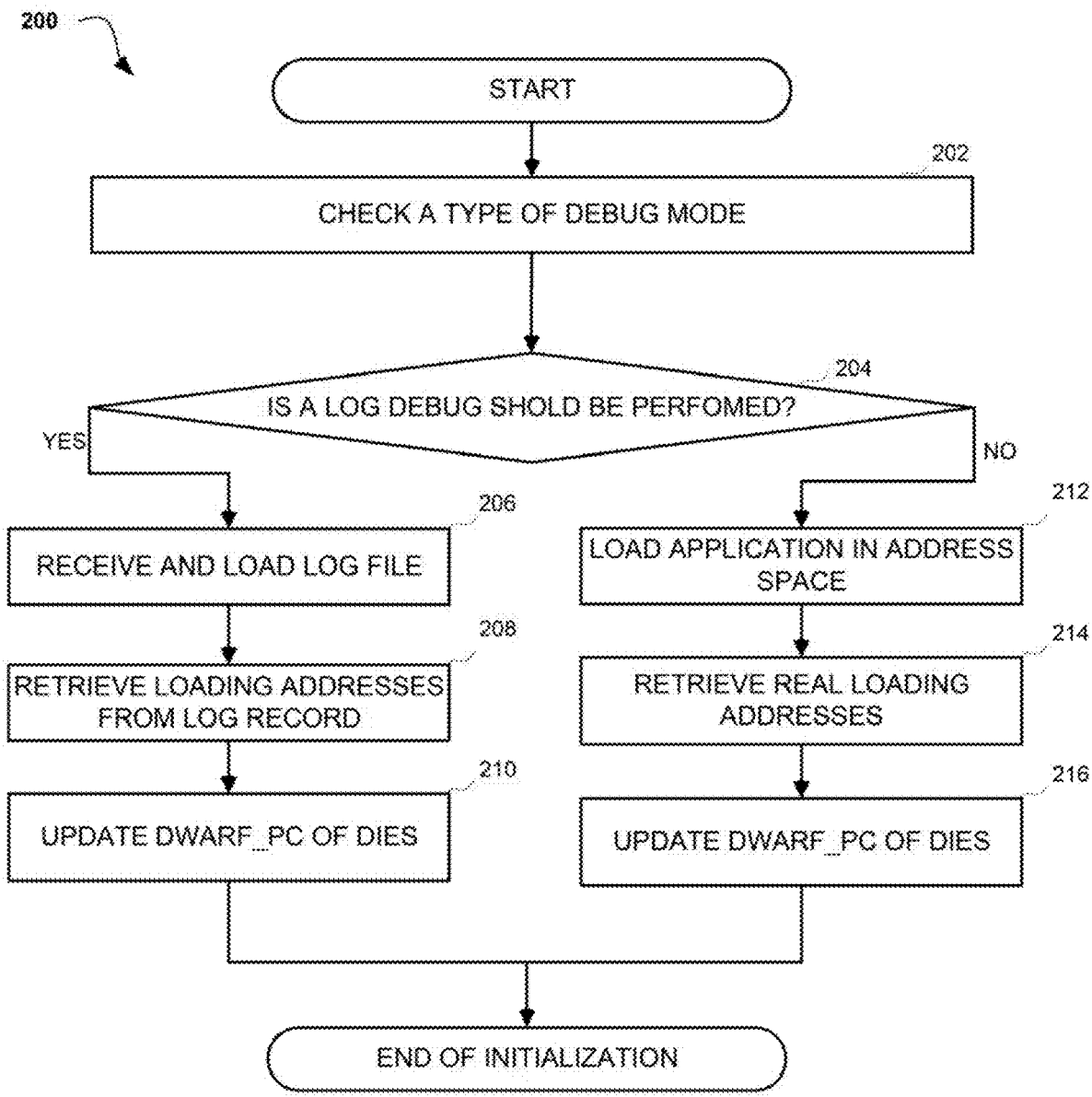
FIG. 2 is an operational flowchart illustrating a debugger session initialization process according to at least one embodiment.

Referring now to FIG. 2, an operational flowchart illustrating a debugger session initialization process 200 is depicted according to at least one embodiment. At 202, the log analysis debugging program 110A, 110B checks a type of debug mode. According to an example embodiment, the log analysis debugging program 110A, 110B may request a developer, using a graphical user interface (GUI) whether the developer wants to run the debugger in a normal mode (by executing an existing application) or to run in a log mode debugging without loading the debugger at the same computer where the software application such as software program 108 is executed. In another embodiment, the log analysis debugging program 110A, 110B may display a directory and, if the user choses a log file, the log analysis debugging program 110A, 110B may determine that the user chose to run the debugger in a log debug environment.

Then, at 204, the log analysis debugging program 110A, 110B determines whether a log debug should be performed. According to an example embodiment, the log analysis debugging program 110A, 110B may determine whether the log debug is chosen based on an input from the user via the GUI. For example, the log analysis debugging program 110A, 110B may display a message requesting the user to choose whether the user wants to run in a log debug mode or as a conventional debugger. In another embodiment, the log analysis debugging program 110A, 110B may determine that it should run the log debug mode based on determining a log file is present in a predefined folder. If the log analysis debugging program 110A, 110B determines that log debugging should be performed (step 204, "YES" branch), the log analysis debugging program 110A, 110B may continue to step 206 to receive and load the log file 118. If the log analysis debugging program 110A, 110B determines that log debugging should not be performed (step 204, "NO" branch), the debugger 124 may continue to step 212 to load the source code 120 and the application 122 in the address space.

Next, at 206, the log analysis debugging program 110B receives and loads the log file. According to an example embodiment, the log analysis debugging program 110B may request a user to choose one or more log files using a GUI. For example, a user may locate one or more log files on a production environment 102 and the log analysis debugging program 110B may copy the one or more log files to the storage device 116 of the developer environment 112. During the loading, the log analysis debugging program 110B may arrange the log file in a database having a loading address and plurality of records where each record has a CurrentAddr and CallingAddr. In another embodiment, the log file may be arranged according to line numbers in order to determine the corresponding line in the source code 120 to the line in the log file 118. In further embodiments, the log analysis debugging program 110B may match the function names from the log file 118 to each line of the source code 120 using a text searching method.

Then, at 208, the log analysis debugging program 110B retrieves loading addresses from log record. According to an example the log analysis debugging program 110B may retrieve the loading address from the corresponding line of the log file 118 of the developer environment 112. As previously mentioned, the log file 118 may be arranged in records where each record include fields such as CurrentAddr that may represent a loading address of a program or specific instruction and CallingAddr that may represent an address of the next instruction or function.

Figure 4:
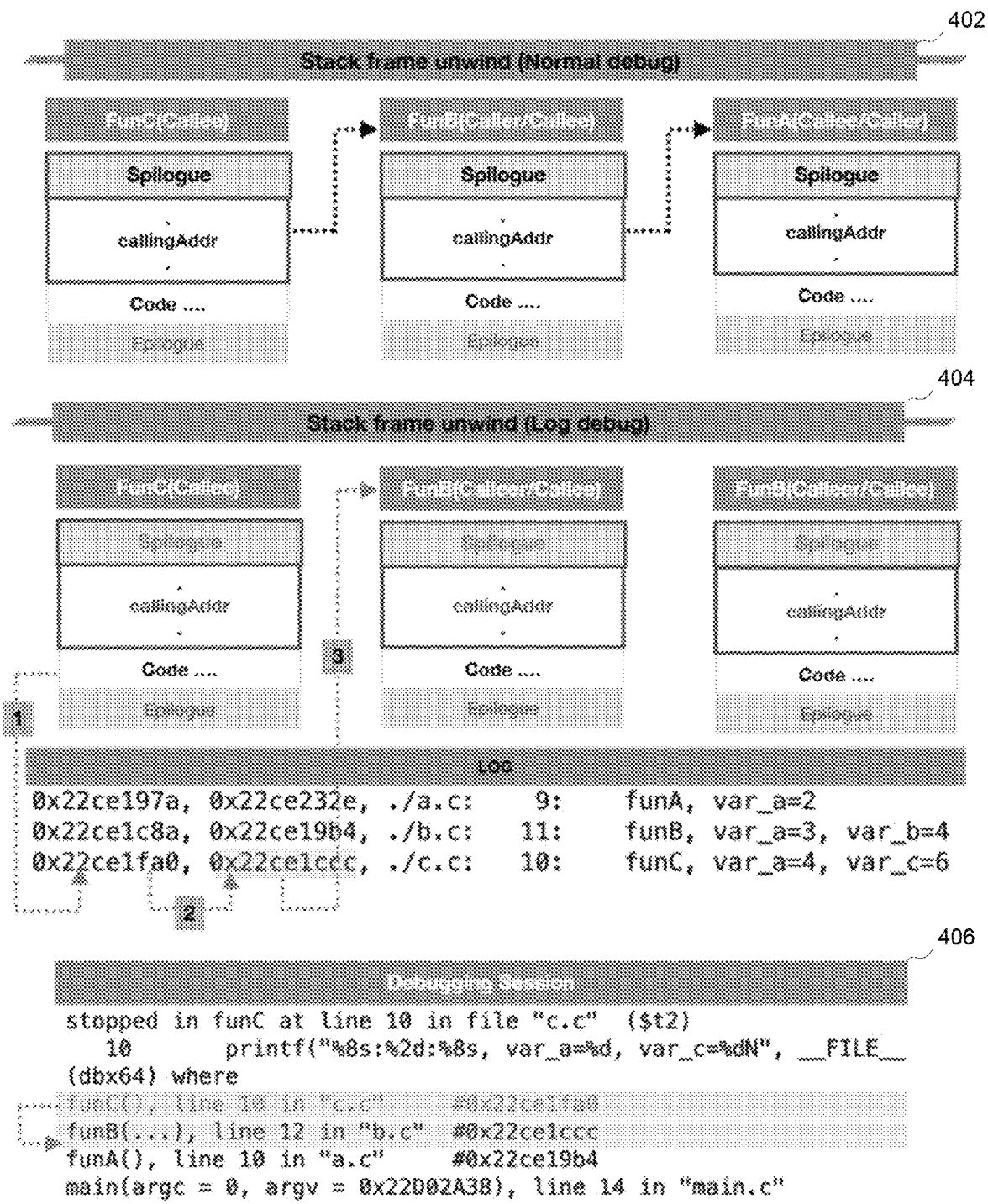
FIG. 4 depicts a stack frame unwinding process during the log debugging according to at least one embodiment.

Next, at 210, the debugger 124 updates DWARF_PC and debugging information entries (DIEs). DWARF is a widely used, standardized debugging data format that is generated by the compiler and consumed by the debugger. The DWARF uses a data structure of DIEs. The DIE may have nested DIEs forming a tree structure. For example, a DIE attribute may refer to another DIE anywhere in the tree, such as a DIE representing a variable would have a DW_AT_type entry pointing to the DIE describing the type of the variable. According to an example embodiment, the debugger 124— may access the DWARF using the loading address and update the DWARF_PC using the log file 118 and debug info 126. The process of updating the DWARF_PC is depicted in FIG. 4 and explained in further details below.

Then, at 212, the debugger 124 loads an application in an address space. According to an example embodiment, when running in normal debugging mode, the debugger 124 may load the application 122 in the address space.

Next, at 214, the debugger 124 retrieves real loading addresses. According to an example embodiment, the debugger 124 may retrieve real loading addresses from the address space where the application 122 is loaded.

Next, at 216, the debugger 124 updates DWARF_PC and debugging information entries (DIEs).

Figure 3:
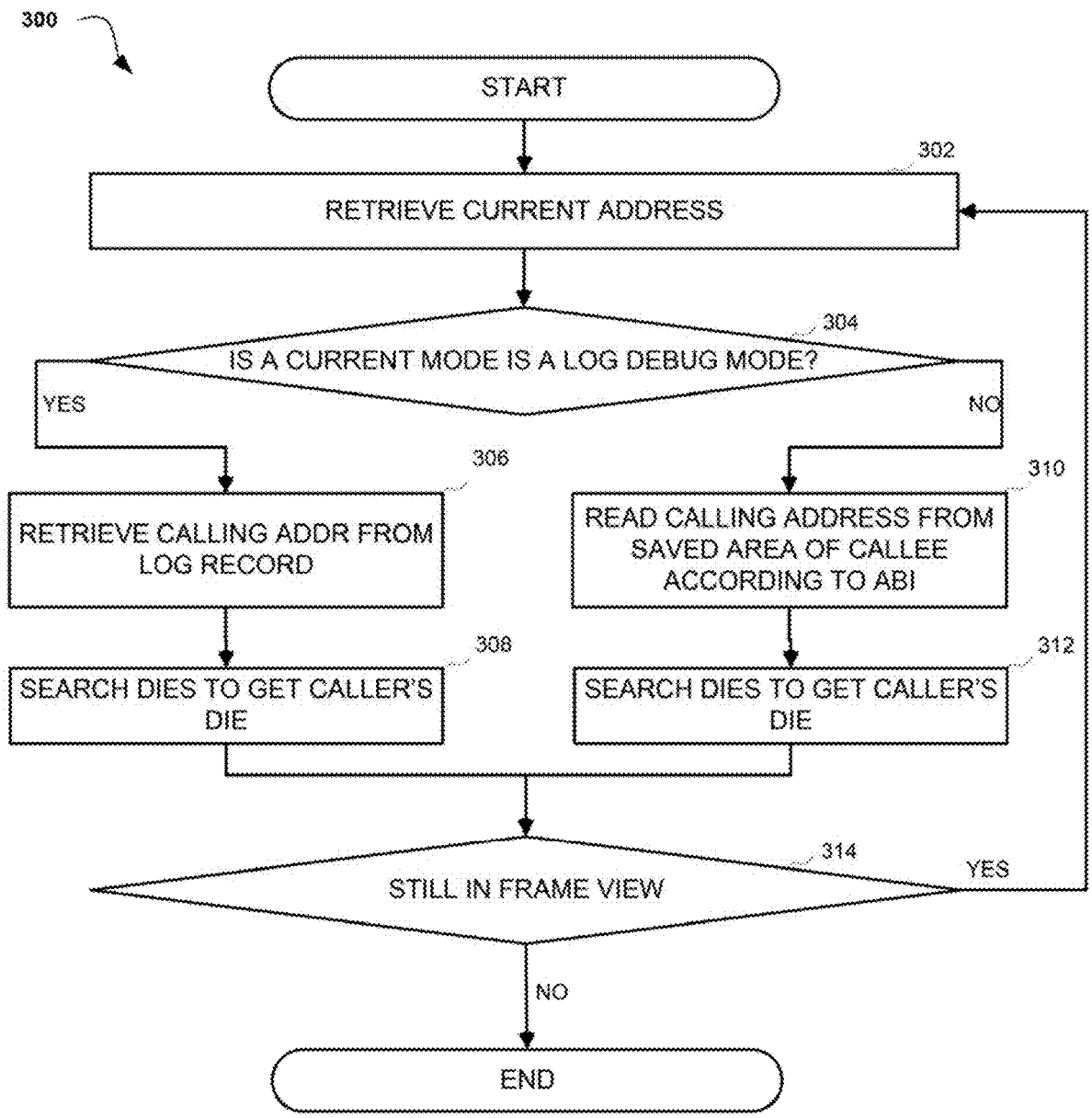
FIG. 3 is an operational flowchart illustrating an active log debugging process according to at least one embodiment.

Referring now to FIG. 3, an operational flowchart illustrating active debugging process 300 is depicted according to at least one embodiment. At 302, the log analysis debugging program 110B retrieves current address. According to an example embodiment, the log analysis debugging program 110B may retrieve the current address using the debugger 124. In another embodiment, the log analysis debugging program 110B may get the current address from the log file 118 or the debugger 124 may get the current address from the address space where the application 122 is loaded. In a further embodiment, the debugger 124 may retrieve the current address from the initiation process (step 2068 or 214), depending whether the debugger runs in a normal mode or in a log debug mode.

Then, at 304, the log analysis debugging program 110B determines whether a current mode is a log debug mode. According to an example embodiment, the log analysis debugging program 110B determines based on an input of the user, by using the GUI that was received during initialization process at step 204. If the log analysis debugging program 110B determines that a log debug was chosen (step 304, "YES" branch), the log analysis debugging program 110B may continue to step 306 to get a calling address from log record of the log file 118. If the log analysis debugging program 110B determines that a log debug was not chosen (step 304, "NO" branch), the log analysis debugging program 110B may continue to step 310 to cause the debugger 124 to read calling address from saved area of callee according to application binary interface (ABI). The ABI, typically, defines a method that data structures or computational routines are accessed in machine code in a low-level, hardware-dependent format.

Next, at 306, the log analysis debugging program 110B retrieves a calling address from a log record. According to an example embodiment, the log analysis debugging program 110B may get the calling address from a corresponding to the instruction record in the log file 118. As previously mentioned, the log file 118 may have additional fields, such as CurrentAddr, and CallingAddr, that enable unwinding of a stack and get the calling address from the log record. In another embodiment, the log analysis debugging program 110B may cause the debugger to display the unwinded stack. This process is further explained below with respect to FIG. 4.

Then, at 308, the log analysis debugging program 110B may cause the debugger 124 to search DIEs to get caller's DIE. According to an example embodiment, the log analysis debugging program 110B may cause the debugger 124 to search the DIEs to identify the caller's DIE and receive the values of the variables associated with the specific instruction. This process is further explained below with respect to FIG. 4.

Then, at 310, the debugger 124 reads the calling address from saved area of the callee according to ABI. According to an example embodiment, the debugger 124 may read the calling address by accessing the application binary interface (ABI).

Then, at 312, the debugger 124 searches DIEs to get caller's DIE. According to an example embodiment, the debugger 124 may search the DIEs to identify the caller's DIE and receive the values of the variables associated with the specific instruction.

Next, at 314, the debugger 124 determines whether a frame view is still active. According to an example embodiment, the debugger 124 determines whether the frame view (stack unwinding view) is still active either by requesting an input from the user or based on determining whether the frame view window is active on a display (GUI). If the debugger 124 determines that the user is still in the frame view (step 314, "YES" branch), the debugger 124 may continue to step 302 to retrieve the current address (CurrentAddr) of a function. If the log analysis debugging program 110B determines that a log debug was not chosen (step 314, "NO" branch), the debugger 124 may terminate.

It may be appreciated that FIGS. 2 and 3 provide only an illustration of one implementation and does not imply any limitations with regard to how different embodiments may be implemented. Many modifications to the depicted environments may be made based on design and implementation requirements. For example, a log debug may be performed synchronously to the regular debugging of the source code in order to determine stack discrepancies between the values of variables in a log debugging and regular debugging. In further embodiments, a breakpoint may be incorporated that halts execution of the source code when the stack or a specific variable is different between regular debugging and log debugging.

Referring now to FIG. 4, a stack frame unwinding process is depicted according to at least one embodiment. Typically, a stack frame is a frame of data that gets pushed onto the stack and frequently is displayed during the debugging process using a GUI. A stack frame may represent an instruction or a function call and a corresponding argument data. During regular debugging, such as during using the debugger 124 a source code that is displayed in a debugging session 406, depicts as an example depicted in FIG. 4, three functions: "funC", "funB" and "funA". During regular debugging these three functions are arranged in a stack as depicted in stack frame unwind (Normal debug) 402, where "funC" has a CallingAddr that points to the next function "funB" and so on. However, during log analysis debugging, the log analysis debugging program 110B determines a stack frame unwind using three steps. First, the log analysis debugging program 110B identifies a current address of "funC" instruction of the source code 120 from the corresponding to the instruction record in the log file 118 (0x22ce1fa0). The corresponding record may be determined, as previously mentioned, either by line number or matching instruction name in the source code to the record in the log file. Second, the log analysis debugging program 110B identifies CallingAddr (0x22ce1ccc) from the corresponding to the instruction in the source code 120 record in the logfile 118. Third, the log analysis debugging program 110B may make the debugger 124 to call the SearchDIE module to identify the DIE of "funB" and get the corresponding dwarf PC that was generated during the initialization process (step 210).

Figure 5:
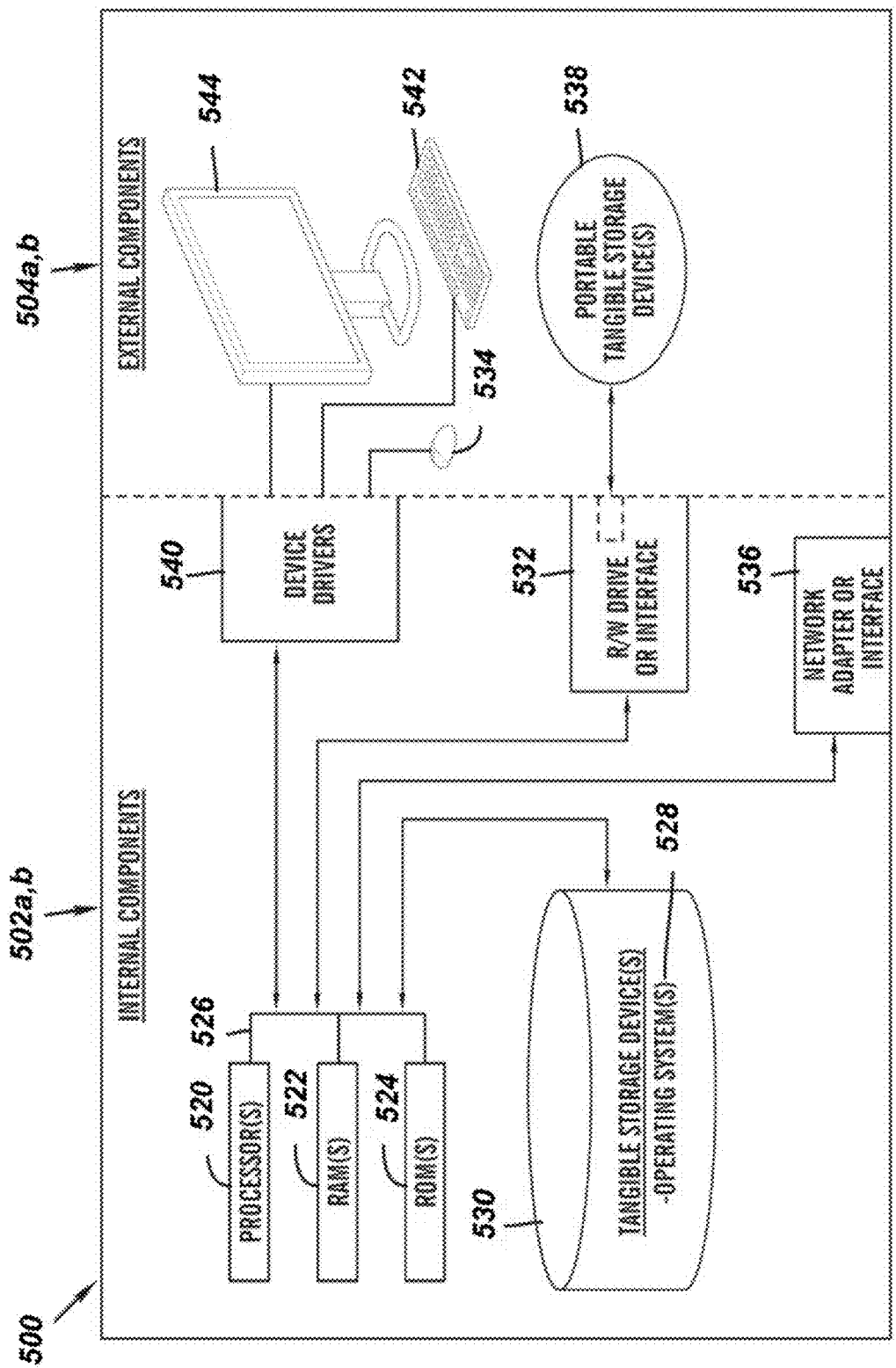
FIG. 5 is a block diagram of internal and external components of computers and servers depicted in FIG. 1 according to at least one embodiment.

FIG. 5 is a block diagram 500 of internal and external components of the production environment 102 and the developer environment 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The production environment 102 and the developer environment 112 may include respective sets of internal components 502 a,b and external components 504 a,b illustrated in FIG. 3. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 328, the software program 108 and the log analysis debugging program 110A in the production environment 102, and the log analysis debugging program 110B in the developer environment 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a RAY drive or interface 532 to read from and write to one or more portable computer-readable tangible storage devices 538 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the log analysis debugging program 110A in the production environment 102 and the log analysis debugging program 110B in the developer environment 112 can be downloaded to the production environment 102 and the developer environment 112 from an external computer via a network (for example, the Internet, a local area network or other, wide area network) and respective network adapters or interfaces 536. From the network adapters or interfaces 536, the software program 108 and the log analysis debugging program 110A in the production environment 102 and the log analysis debugging program 110B in the developer environment 112 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, RAY drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
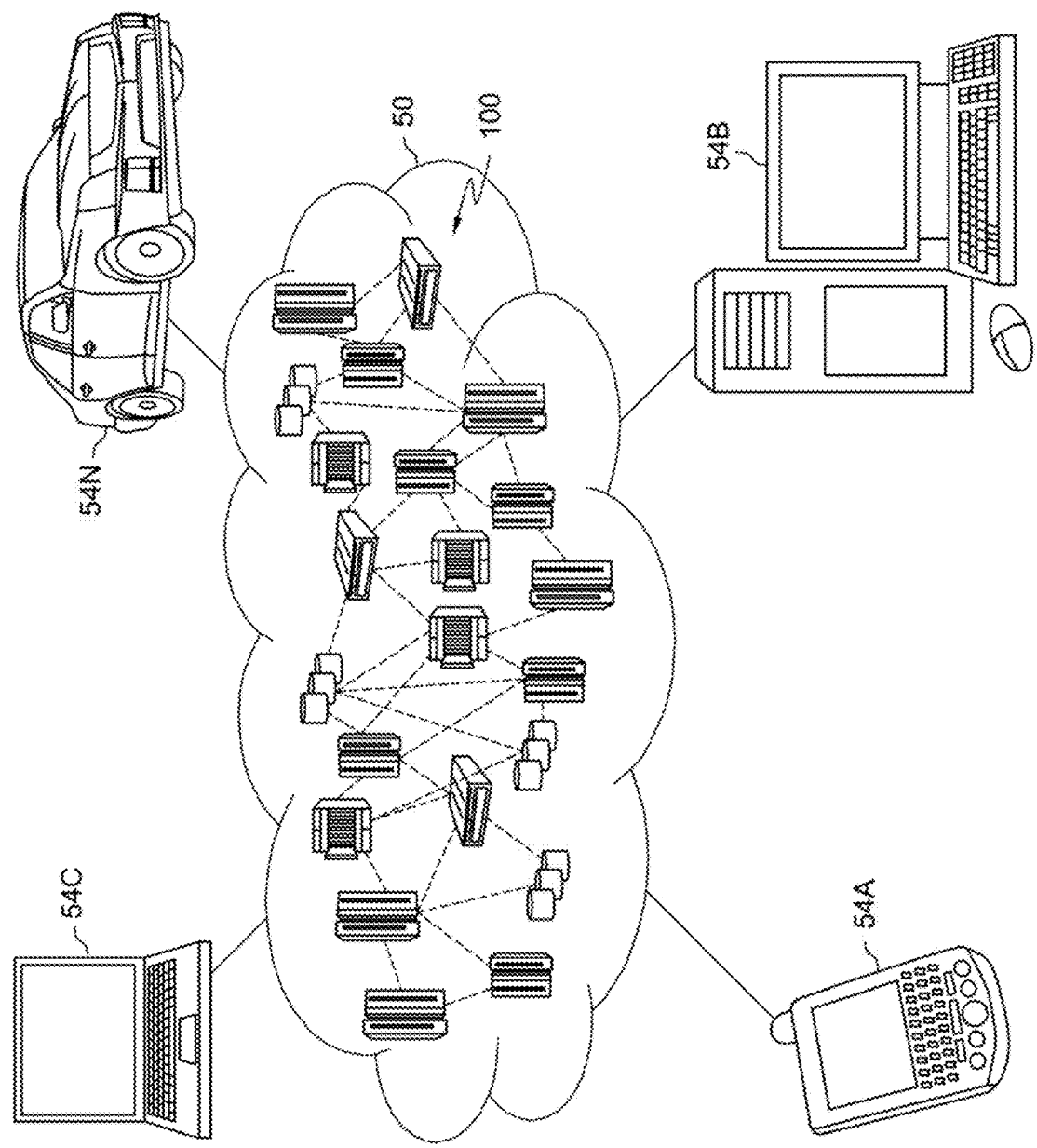
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
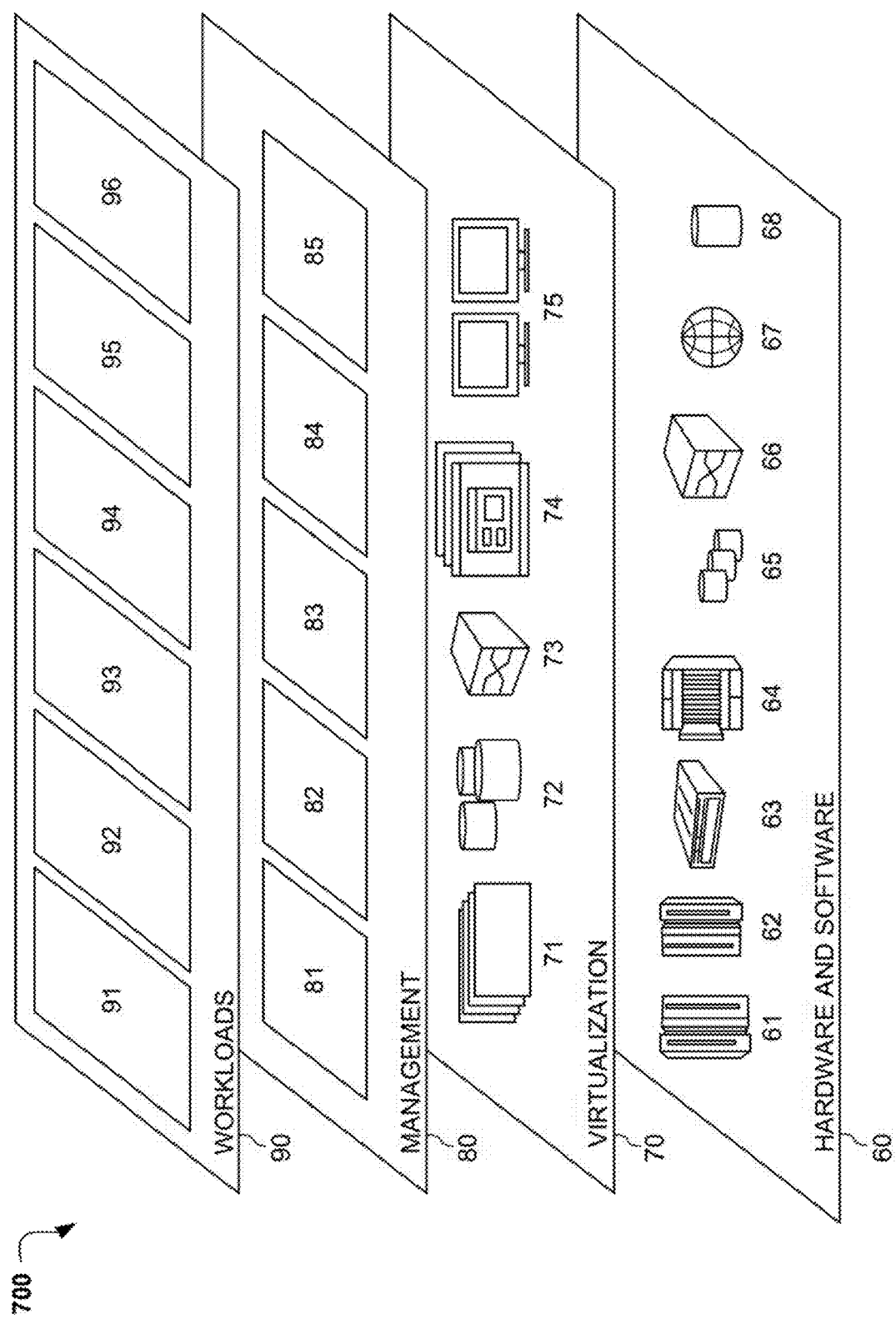
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log debugging 96. Log debugging 96 may relate to simulating a debugging process without actual step by step execution of the instructions in the production environment, where the stack frame is generated using the records of the log file.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for log debugging in a developer environment, the method comprising:

receiving a log file, wherein the log file comprises one or more records associated with the one or more instructions in a source code;
loading, using a debugger, the log file and the source code;
receive a loading address from the log file;
updating a debugging data format (DWARF) with the one or more records of the log file, wherein the DWARF is accessed using the loading address and comprises one or more data structure entries;
identifying a calling address from the log file;
identifying the one or more data structure entries associated with the calling address; and
unwinding a stack frame without running the debugger, wherein the unwinding of the stack frame comprises:
identifying a current program execution address from a corresponding to an instruction record of the log file by matching an instruction name in the source code to the instruction record in the log file;
identifying an entry address of the called routine from the record of the log file; and
causing the debugger to search the DWARF for a data structure entry associated with the entry address of the called routine.

2. The method of claim 1, further comprising:
displaying the stack frame based on the one or more data structure entries associated with the calling address.

3. The method of claim 1, wherein each of the one or more records comprises the current program execution address (CurrentAddr) and the entry address of the called routine (CallingAddr).

4. The method of claim 1, wherein the loading address is determined based on matching a name of the one or more instructions in the source code to the one or more records in the log file.

5. The method of claim 1, further comprises:
determining whether a frame view is active.

6. The method of claim 1, wherein the log file is received from a product environment.

7. A computer system for log debugging in a developer environment, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a log file, wherein the log file comprises one or more records associated with the one or more instructions in a source code;
loading, using a debugger, the log file and the source code;
receive a loading address from the log file;
updating a debugging data format (DWARF) with the one or more records of the log file, wherein the DWARF is accessed using the loading address and comprises one or more data structure entries;
identifying a calling address from the log file;
identifying the one or more data structure entries associated with the calling address; and
unwinding a stack frame without running the debugger, wherein the unwinding of the stack frame comprises:
identifying a current program execution address from a corresponding to an instruction record of the log file by matching an instruction name in the source code to the instruction record in the log file;

identifying an entry address of the called routine from the record of the log file; and causing the debugger to search the DWARF for a data structure entry associated with the entry address of the called routine.

8. The computer system of claim 7, further comprising: displaying the stack frame based on the one or more data structure entries associated with the calling address.

9. The computer system of claim 7, wherein each of the one or more records comprises the current program execution address (CurrentAddr) and the entry address of the called routine (CallingAddr).

10. The computer system of claim 7, wherein the loading address is determined based on matching a name of the one or more instructions in the source code to the one or more records in the log file.

11. The computer system of claim 7, further comprising: determining whether a frame view is active.

12. The computer system of claim 7, wherein the log file is received from a product environment.

13. A computer program product for log debugging in a developer environment, the computer program product comprising:

one or more computer-readable tangible storage medium and program instructions stored on at least one of the one or more tangible storage medium, the program instructions executable by a processor, the program instructions comprising:

program instructions to receive a log file, wherein the log file comprises one or more records associated with the one or more instructions in a source code;

program instructions to load, using a debugger, the log file and the source code;

program instructions to receive a loading address from the log file;

program instructions to update a debugging data format (DWARF) with the one or more records of the log file, wherein the DWARF is accessed using the loading address and comprises one or more data structure entries;

program instructions to identify a calling address from the log file; and program instructions to identify the one or more data structure entries associated with the calling address; and program instructions to unwind a stack frame without running the debugger, wherein the program instructions to unwind of the stack frame comprises:

program instructions to identify a current program execution address from a corresponding to an instruction record of the log file by program instructions to match an instruction name in the source code to the instruction record in the log file;

program instructions to identify an entry address of the called routine from the record of the log file; and program instructions to cause the debugger to search the DWARF for a data structure entry associated with the entry address of the called routine.

14. The computer program product of claim 13, further comprising:

program instructions to display the stack frame based on the one or more data structure entries associated with the calling address.

15. The computer program product of claim 13, wherein each of the one or more records comprises the current program execution address (CurrentAddr) and the entry address of the called routine (CallingAddr).

16. The computer program product of claim 13, wherein the loading address is determined based on program instructions to match a name of the one or more instructions in the source code to the one or more records in the log file.

17. The computer program product of claim 13, further comprising:

program instructions to determine whether a frame view is active.

* * * * *